US007844591B1

(12) United States Patent
Lettau et al.

(10) Patent No.: US 7,844,591 B1
(45) Date of Patent: Nov. 30, 2010

(54) METHOD FOR DISPLAYING AN IMAGE WITH SEARCH RESULTS

(75) Inventors: Tyler J. Lettau, Hercules, CA (US); Andrew Borovsky, London (GB)

(73) Assignee: Adobe Systems Incorporated, San Jose, CA (US)

( * ) Notice: Subject to any disclaimer, the term of this patent is extended or adjusted under 35 U.S.C. 154(b) by 379 days.

(21) Appl. No.: 11/580,569

(22) Filed: Oct. 12, 2006

(51) Int. Cl.
*G06F 17/00* (2006.01)

(52) U.S. Cl. ........................ 707/706; 707/708; 707/710

(58) Field of Classification Search ........................ None
See application file for complete search history.

(56) References Cited

U.S. PATENT DOCUMENTS

| | | | | |
|---|---|---|---|---|
| 5,617,119 A * | 4/1997 | Briggs et al. | ................ | 707/100 |
| 5,911,139 A * | 6/1999 | Jain et al. | ........................ | 707/3 |
| 6,009,410 A * | 12/1999 | LeMole et al. | ................ | 705/14 |
| 6,184,858 B1 * | 2/2001 | Christian et al. | ............ | 345/634 |
| 6,809,741 B1 * | 10/2004 | Bates et al. | ................. | 345/597 |
| 6,901,378 B1 * | 5/2005 | Linker et al. | .................. | 705/27 |
| 2002/0035595 A1 * | 3/2002 | Yen et al. | ..................... | 709/203 |
| 2002/0120506 A1 * | 8/2002 | Hagen | ......................... | 705/14 |
| 2002/0169670 A1 * | 11/2002 | Barsade et al. | ................ | 705/14 |
| 2003/0083937 A1 * | 5/2003 | Hasegawa et al. | ............. | 705/14 |
| 2004/0015398 A1 * | 1/2004 | Hayward | ..................... | 705/14 |
| 2004/0103027 A1 * | 5/2004 | Yamamoto et al. | ............ | 705/14 |
| 2004/0210479 A1 * | 10/2004 | Perkowski et al. | ............ | 705/14 |
| 2005/0102201 A1 * | 5/2005 | Linker et al. | ................. | 705/27 |
| 2005/0137939 A1 * | 6/2005 | Calabria et al. | ............... | 705/26 |
| 2005/0144065 A1 * | 6/2005 | Calabria et al. | ............... | 705/14 |
| 2005/0144069 A1 * | 6/2005 | Wiseman et al. | .............. | 705/14 |
| 2005/0154718 A1 * | 7/2005 | Payne et al. | ..................... | 707/3 |
| 2005/0165642 A1 * | 7/2005 | Brouze et al. | ................. | 705/14 |
| 2005/0222989 A1 * | 10/2005 | Haveliwala et al. | ............ | 707/3 |
| 2006/0004630 A1 * | 1/2006 | Criddle et al. | ................. | 705/14 |
| 2006/0036569 A1 * | 2/2006 | Kim | .............................. | 707/1 |
| 2006/0069617 A1 * | 3/2006 | Milener et al. | ................. | 705/14 |
| 2006/0149625 A1 * | 7/2006 | Koningstein | .................. | 705/14 |
| 2006/0253491 A1 * | 11/2006 | Gokturk et al. | ........... | 707/104.1 |
| 2007/0016492 A1 * | 1/2007 | Linker et al. | ................... | 705/26 |
| 2007/0162428 A1 * | 7/2007 | Williams et al. | ............... | 707/3 |
| 2007/0171286 A1 * | 7/2007 | Ishii et al. | .................... | 348/239 |
| 2007/0239530 A1 * | 10/2007 | Datar et al. | .................... | 705/14 |
| 2007/0262950 A1 * | 11/2007 | Lai et al. | ...................... | 345/156 |
| 2007/0296738 A1 * | 12/2007 | Louch et al. | ................. | 345/634 |
| 2008/0050092 A1 * | 2/2008 | Erickson | ....................... | 386/95 |

(Continued)

OTHER PUBLICATIONS

Research Sources and Findings: Banner Ad Placement Study, a document whose Web address is: http://www.webreference.com/dev/banners/research.html (visited Feb. 27, 2007), published Jun. 6, 1997.

(Continued)

*Primary Examiner*—Charles Rones
*Assistant Examiner*—Kurt Mueller
(74) *Attorney, Agent, or Firm*—Robert C Kowert; Meyertons, Hood, Kivlin, Kowert & Goetzel, P.C.

(57) ABSTRACT

A method for displaying an image with search results is described, including detecting a trigger related to a search request, selecting an image and retrieving the image in response to detecting the trigger, determining a search result in response to detecting the trigger, presenting the search result and the image with the search result.

11 Claims, 7 Drawing Sheets

U.S. PATENT DOCUMENTS

2008/0065602 A1 * 3/2008 Cragun et al. .................. 707/3
2008/0091527 A1 * 4/2008 Silverbrook et al. .......... 705/14
2008/0097843 A1 * 4/2008 Menon et al. ................. 705/14
2008/0235608 A1 * 9/2008 Prabhu ....................... 715/765
2008/0306815 A1 * 12/2008 Dykes et al. ................. 705/14
2008/0306816 A1 * 12/2008 Matthys et al. ............... 705/14

OTHER PUBLICATIONS

Observations on Advertising, a document whose Web address is: http://www.poynterextra.org/eyetrack2004/advertising.htm (visited Feb. 27, 2007), published Sep. 8, 2004.

* cited by examiner

METHOD FOR DISPLAYING AN IMAGE WITH SEARCH RESULTS

FIELD OF THE INVENTION

The present invention relates generally to software. More specifically, a method for displaying an image with search results is described.

BACKGROUND OF THE INVENTION

A user may search a database by creating a search request, submitting the search request to a search engine, and receiving search results. A database may be a collection of Internet websites, data on a user's hard drive, a subset of one or both, or any other aggregate of data. A search engine is any program that crawls a database looking for search results to present to the user based on the user's search request. Search results may be returned to the user based on an algorithm used to crawl a database the user is searching.

Search results may be returned to a user as a group of selectable items such as links. For example, a user may search the World Wide Web (WWW) and receive a list of text links to Internet websites. The search results may be displayed within a window, for example, and may be listed in order of relevance. The appearance of search results may be dull and uninspiring, and may not sufficiently take advantage of available graphics technology.

Thus, what is needed is a search application without the limitations of conventional techniques.

BRIEF DESCRIPTION OF THE DRAWINGS

Various examples are disclosed in the following detailed description and the accompanying drawings.

DETAILED DESCRIPTION

Various examples may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the examples has not been described in detail to avoid unnecessarily obscuring the description.

According to various examples, a method for displaying an image with search results is disclosed. A user or a process may create a search request and initiate a search by activating a trigger. The search request may include search terms that a user or process wishes to search for. A search may include the process of scouring a database or other information store for search results related to the search request. Search results may include text, icons, image, links or other content that present the outcome of the search according to an algorithm that is executed when the search is conducted. The trigger is an event that occurs to initiate a search to generate search results. When the trigger is received, the image may be selected based on various criteria. Search results are determined, and the image is displayed with the search results. For example, a trigger may be received, an image related to the search request may be selected, and the image may be displayed behind the search results. The image may be a background image similar to a desktop wallpaper, for example. According to other examples, the image may be related to a search request, related to a category of a search request, or may be an advertisement. An image may be related to a search request if the image includes a subject matter of the search request, for example. An image may be related to a category of the search request if the image displays a genre of the search request. Additionally, images may match given search requests based on metadata associated with the image.

Image Displayed with Search Results

Figure 1A:
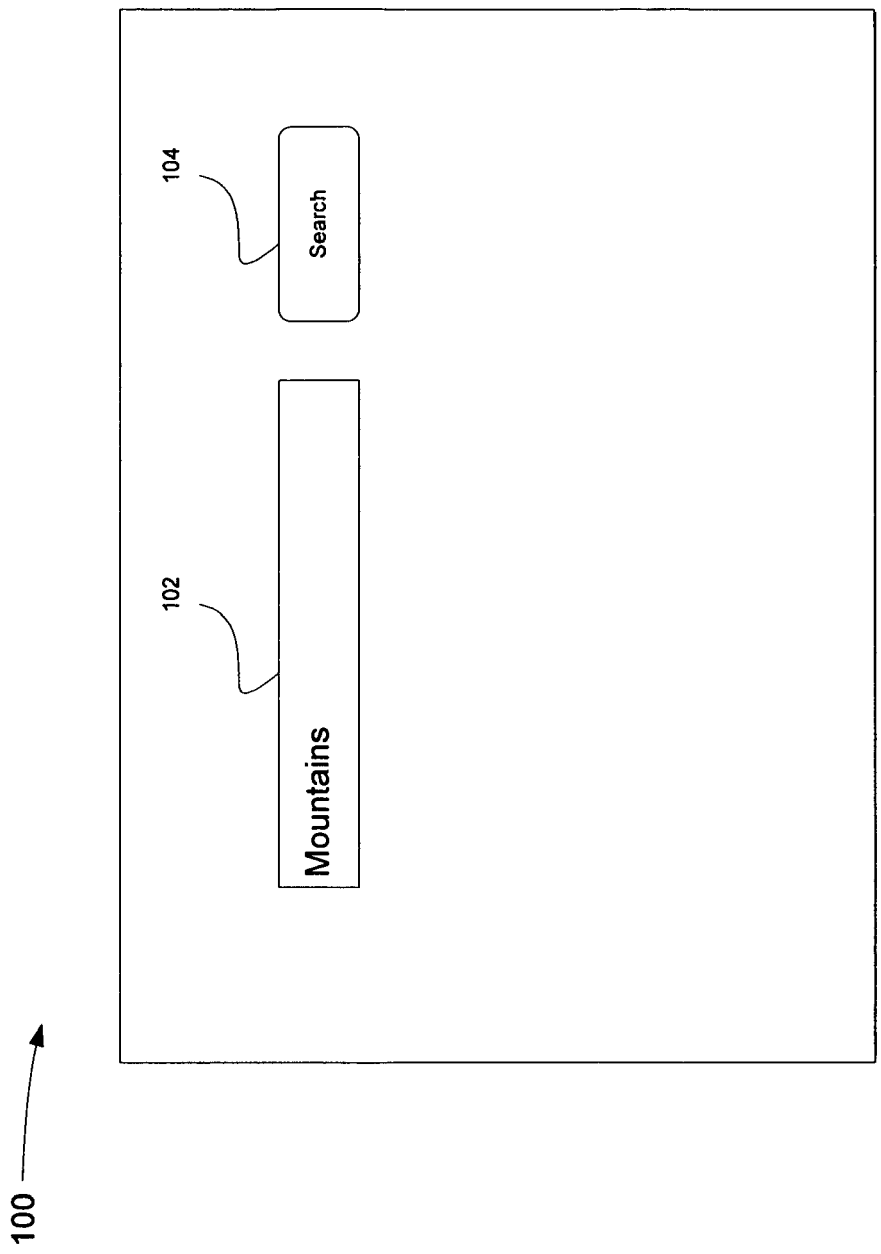
FIGS. 1A-1C illustrate a search request, search results, and an image displayed with the search results according to various examples.
Figure 1B:
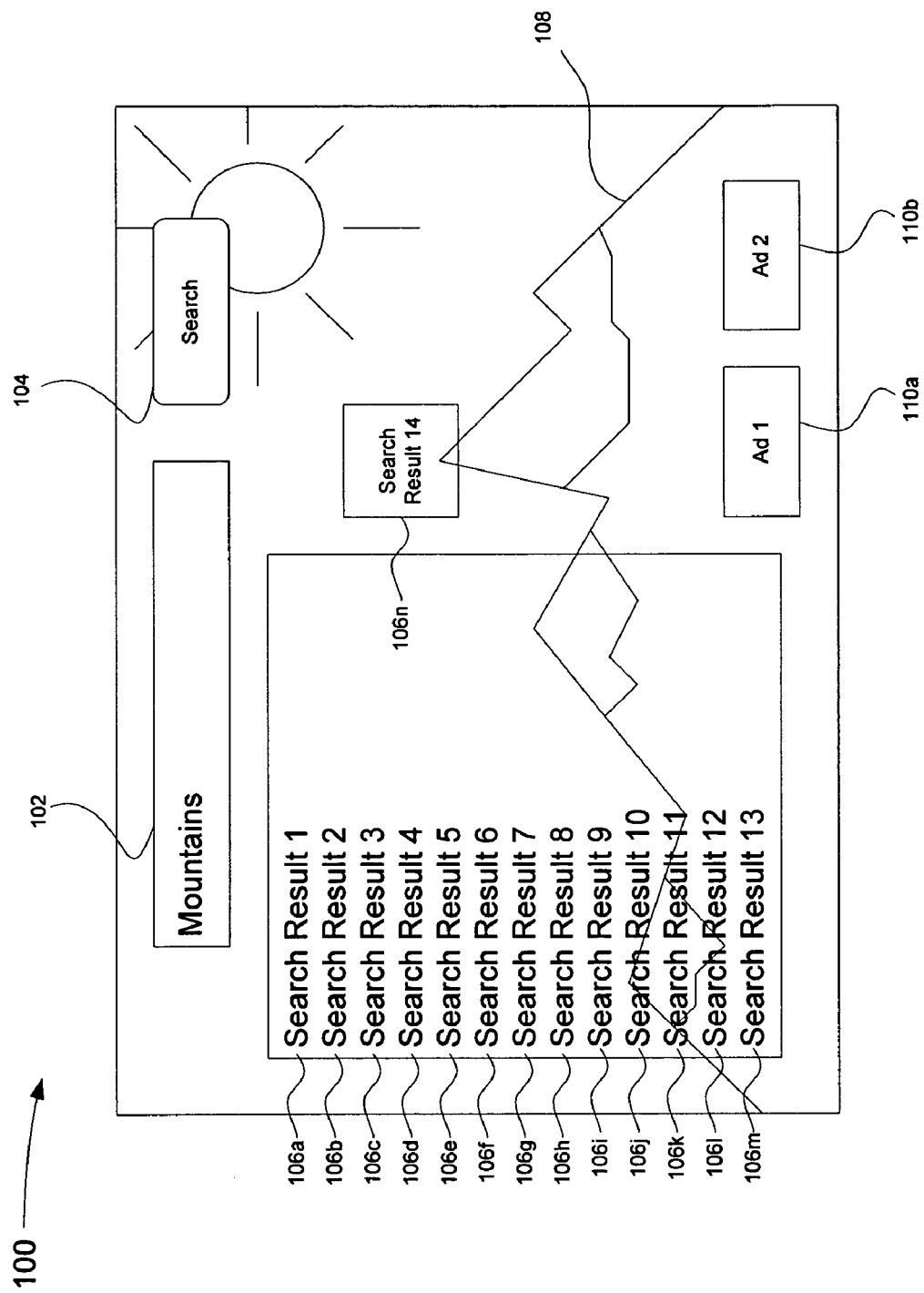
Figure 1C:
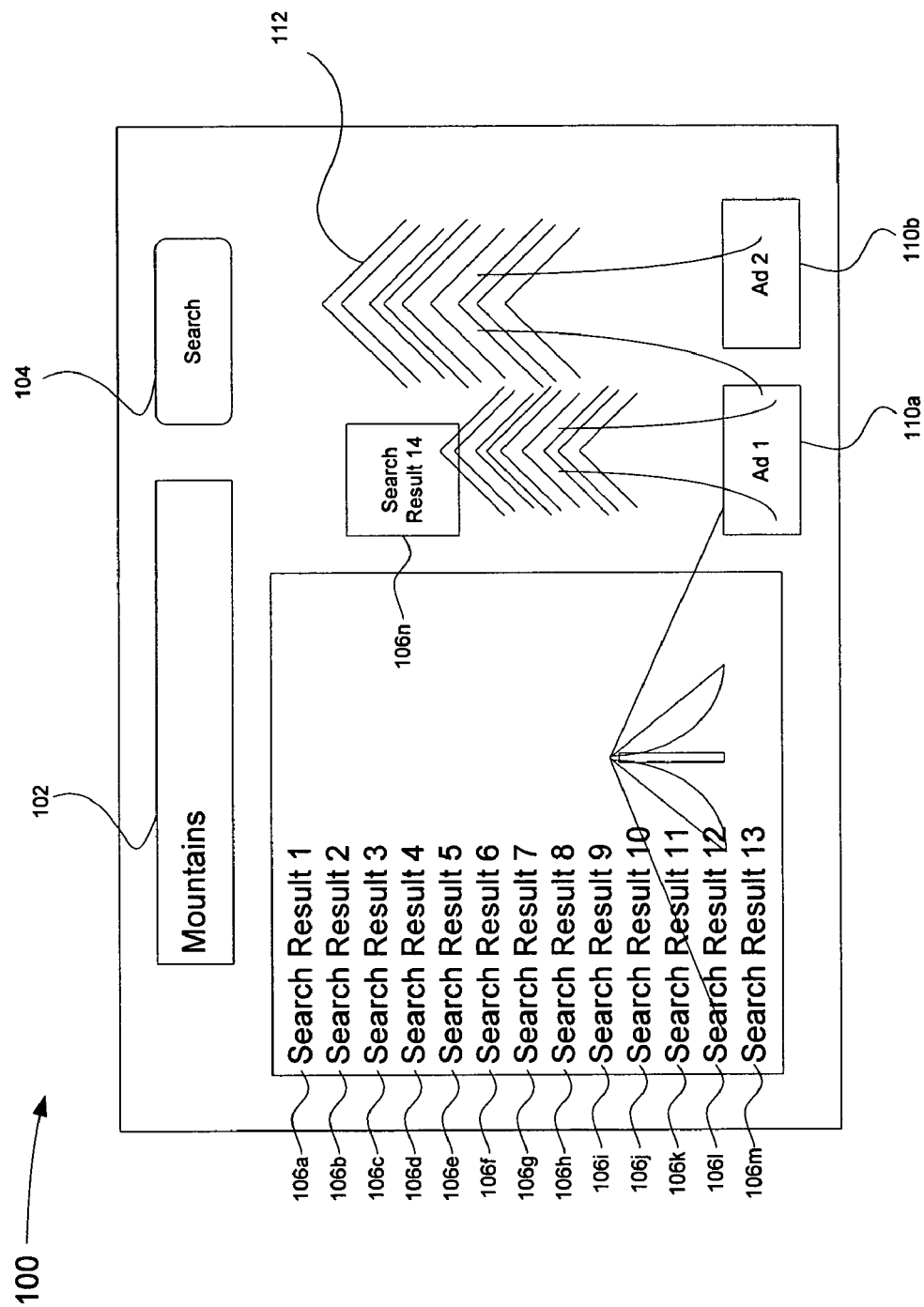

FIGS. 1A-1C illustrate a search request, search results, and an image displayed with the search results according to various examples. When a search request is made, an image may be selected, retrieved, and displayed with the search results to brand the search. "Branding" a search may include displaying the image behind the search results to give the user an enhanced experience related to a brand represented by the image. For example, the search request may be for an artist or a character, and the image may brand the search results by displaying the artist or character with the search results. The image may also be displayed to otherwise enhance the search experience. For example, an image may improve the appearance of search results or immerse the user in the search results.

The image may or may not be related to the search results or search request, and may or may not be an advertisement, according to various examples. Further, if an image that is strongly related to the search request is found, it may be displayed (see, e.g., FIG. 1B). A strongly-related image may be an image that includes or is closely related to the search request. Alternatively, if there is an image that is more weakly-related to the search request (e.g., relating to a genre or a category of the search request), that image may be displayed (see, e.g., FIG. 1C).

FIG. 1A illustrates a window 100 including a search request box 102 and a search button 104 according to an example. The window 100 displays a search environment that may allow a search engine to perform a search and return search results. According to other examples, instead of the window 100, any graphical environment may be used, such as a frame, pane, or other windowless environment. Additionally, the window 100 may be, for example, a portion of a web browser or other software application that may include a search feature. Examples of other applications include media players (e.g., to play or purchase video or audio or display images) that have a search feature allowing a user to search for titles he owns, or may wish to purchase.

A user may enter a search request into the search request box 102. The search request may have an identifiable subject matter. For example, as shown here, the search request is "mountains." When a user selects the search button 104, the window 100 returns search results related to mountains. Selecting the search button 104 is an example of a trigger that initiates a search and begins the selection of an image to display with the search results. According to various examples, selecting and retrieving an image to display with search results may be initiated upon receiving a trigger. The search results may be culled from various sources. For example, the window 100 may search a database, such as an internal database, a remote database, or the Internet using various commercial or other search engines. A local database may be, for example, a collection of media (e.g., images, audio clips) on a user's computer system.

According to another example, a search may be initiated by a user typing. A user may be able to receive search results on-the-fly, while typing, or otherwise inputting data into a computer system. For example, as a user types each letter of a search term or string, a search request may be dynamically modified, thus narrowing a search field down. When the user types the first letter of the request, all or a subset of the search results beginning with that letter may be displayed. When the user types the second letter of the request, the displayed results may be narrowed to those results having the first and the second letters of the request, and so on. When the user types a letter so that single result may be displayed, the image may be displayed with the result. For example, the user may type m-o-u-n-t-a, and when the user types 'a', a single result is returned—"mountains." Typing the letter 'a' becomes the trigger for the search (i.e., the act of typing 'a' initiates the process of selecting and retrieving an image), and the image is displayed with the search results.

FIG. 1B illustrates an image displayed with returned search results according to an example. After the search button 104 has been selected to trigger the search, search results 106 may be displayed in the window 100. The search results 106 may have any format, may be textual, graphical, or iconic, and may be selected and retrieved using any technique, as described above. The search results 106 may include, for example, a textual results (e.g., hypertext links) 106a-106m, and an icon 106n. The icon 106n may be a graphical result that displays a visual representation of the search result, a textual representation of the search result, or a combination of graphics and text.

An image 108 is displayed with the search results 106. According to an example, the image 108 is displayed behind the search results 106, so that the search results 106 are presented over the image 108. For example, the image 108 may be a background image similar to a desktop wallpaper. The image 108 may be chosen because it is related to the search request. For example, here, the search request is "mountains," and the image 108 shows a mountain range. According to other examples, the image 108 is not related to the search results 106, and may be chosen for other reasons. For example, the image 108 may be an advertisement or an image otherwise unrelated to the search request. According to another example, if an image directly related to the subject matter cannot be found (e.g., an image of mountains cannot be found), an image related to a genre or category of the search request (e.g., an image of the outdoors or nature) may be used (see FIG. 1C). According to a further example, the image 108 may be animated, may include animated portions, or may be a video or include video portions.

The image 108 lends context to the search results. The image 108 may be used to enhance a user's experience when searching for a particular subject matter. For example, a user may be searching a home database of music for a particular artist. When the artist's songs are found, an image of the artist may be displayed with the search results (e.g., the songs) to enhance that user's experience. Additionally, the image 108 may be used to heighten brand awareness when, for example, an artist, character, film, or television show is searched for.

Figure 2:
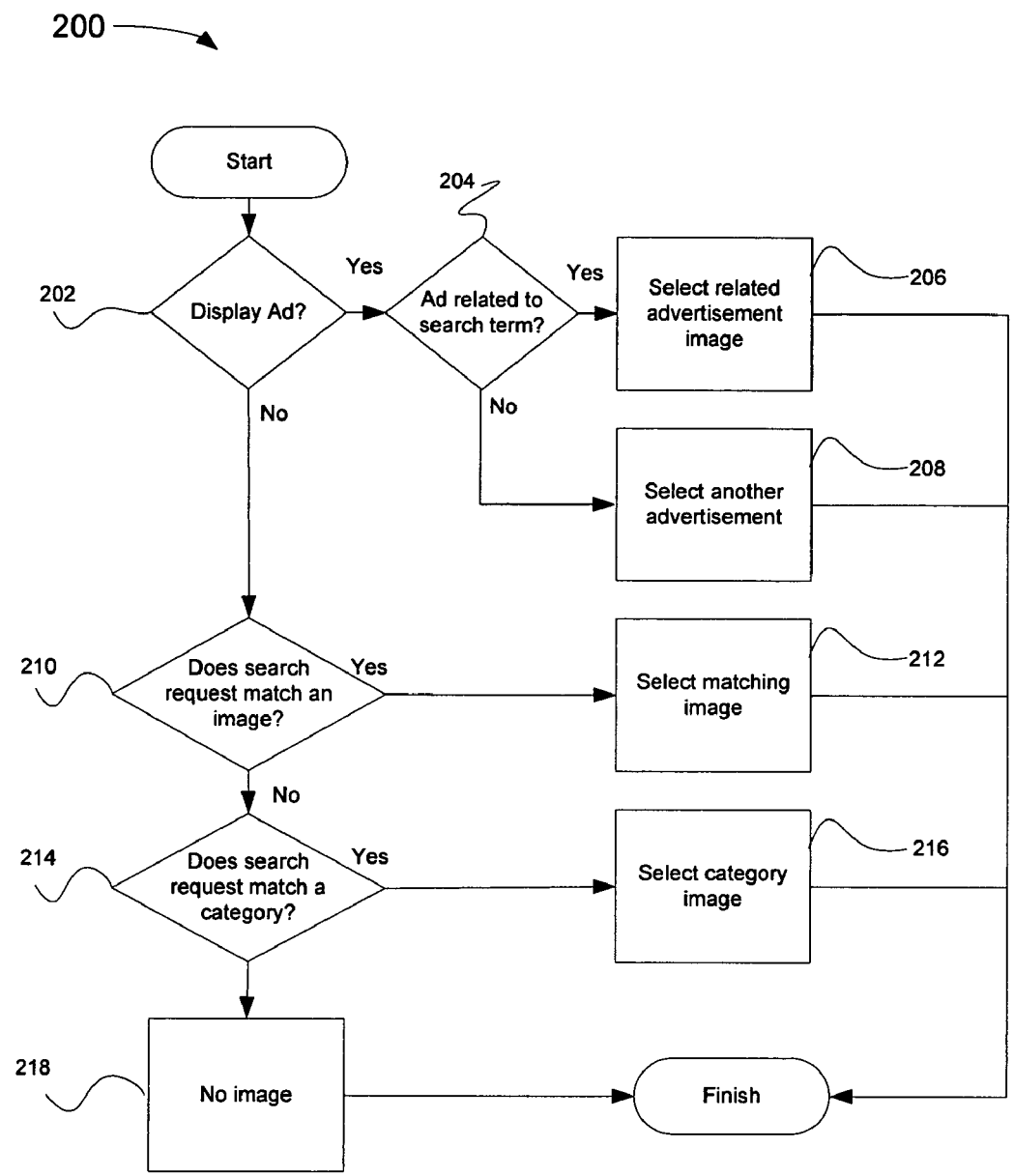
FIG. 2 is a flowchart describing a process for selecting an image to present with search results according to various examples.

The image 108 may be chosen from a collection of images. The images may reside on a local or remote system (e.g., through the Internet or another network), and may each have various metadata describing the subject matter and other characteristics of each image. For example, an image may have metadata indicating a title of the image, a genre or category of the image, a subject of the image, and resolution and color depth of the image. The resolution and color depth of the image may be used to determine whether an image is appropriate for the current search request (e.g., depending on a user's display resolution, some images may have too low a resolution). The title, subject, and category of an image may all be used to determine whether an image is appropriate for displaying with the search results. With some search requests, a particular image may automatically match certain search requests (e.g., the search request "mountains" may be automatically matched to the image 108). FIG. 2 is a flowchart describing a process for choosing an image such as the image 108 for displaying with the search results 106.

A color of the search results 106 may be determined based on a color of a portion of the image 108 behind the search results 106. The search results 106 may be displayed in such a way that the color of each search result 106 is legible depending on the location of the search result 106 over the image 108. For example, the search results 106a-106j may be displayed over a dark sky (e.g., during a sunset), in which case a lighter color (e.g., white) may make the search results 106a-106i more legible. The search results 106k-106m may be displayed over light gray mountains and white snow, and a dark color (e.g., black) may make the text of the search results 106k-106m easier to read. Alternatively, different letters of a search result may have different colors. For example, various letters of the search result 106j may have different colors depending on which letter is over what portion of the image 108.

Additional content, such as two advertisements 110, are displayed in the window 100. The advertisements 110 are examples of additional content that may be displayed separate from the search results 106 and with the image 108. According to an example, the advertisements may be related to the search request (e.g., they may be advertisements for mountain travel). As another example, if a user searches their music collection for a particular artist, the advertisements 110 may be for works by the artist that the user does not own. According to other examples, other content may be displayed in place of the advertisements 110.

FIG. 1C illustrates a category image 112 related to a category of a search request according to an example. For certain search requests, an image that is strongly related to the search request may be found. In other cases, an image of a category to which the search request belongs may be used. These images may be described as being weakly related to the search requests for which they were chosen. For example, if no image of mountains can be located (e.g., the image 108), an image of the outdoors, such as the category image 112 may be alternatively used. The category image 112 depicts the outdoors and camping, and may an appropriate match for searches such as "mountains," "outdoors," "camping," or "forest." FIG. 2 describes a process for selecting an image according to various examples.

According to other examples, categorical images may also be used for locations or other types of search requests. For example, if a user searches for "Sydney, Australia," an image of the Sydney Opera House may be displayed. However, if the user searches for a lesser known destination such as "Santa Clara, Calif.," a more generic image, such as an image suggesting travel may be chosen. Alternatively, a better-known nearby city, such as San Francisco, may have a suitable image that may be displayed for the search for Santa Clara.

Process for Selecting Media

FIG. 2 is a flowchart describing a process 200 for selecting an image to present with search results according to various examples. The process 200 may be used in conjunction with the process 300 (see FIG. 3) to select and retrieve an image. The process 200 generally describes searching a database of images for an image appropriate to display with the search results for a search request. It is understood that the process 200 describes various criteria for selecting an image. Some of these criteria may be omitted, and other criteria may be added.

In operation 202, it is determined whether an advertisement is to be displayed. An advertisement may be displayed whenever the entity (e.g., a search engine) returning the search results wishes to present one. If an advertisement is to be displayed, in operation 204 it is determined whether there are any advertisements that are related to the search request. There may be a list of search requests for each advertisement, or an advertisement may be chosen by analyzing the metadata of an advertisement image and comparing it to the search request. If there is a related advertisement image, in operation 206 the related advertisement image is selected. If there is no related advertisement image, in operation 208, another advertisement is chosen. The advertisement may be chosen, for example, from at random from a pool of advertisements, or using other criteria.

In operation 210, if no advertisement is to be displayed, it is determined whether the search request matches an image. Various images may have search requests with which they are matched so that they are automatically selected for those search requests. For example, the image 108 may be selected every time the search request "mountains" is presented. These pairings may be made in the metadata of the images. For example, an image's metadata may include a list of search requests or individual terms that result in the image automatically being chosen.

Alternatively, other metadata of an image, for example the image's title, subject, or genre may be examined. The title, subject, or genre of various images may be compared with a search request to determine an image to select. If the search request does match an image, in operation 212, the matching image is selected. If the search request does not match an image, the process 200 continues to operation 214.

In operation 214, it is determined whether the search request matches a category. For example, search requests for "mountains," "outdoors," "camping," or "forest" may match a category belonging to the image 112. The image 112 may be selected in this case. If there is no category, in operation 216, no image is selected, and the process 200 finished.

Process for Receiving a Search Request and Presenting Media with Search Results

Figure 3:
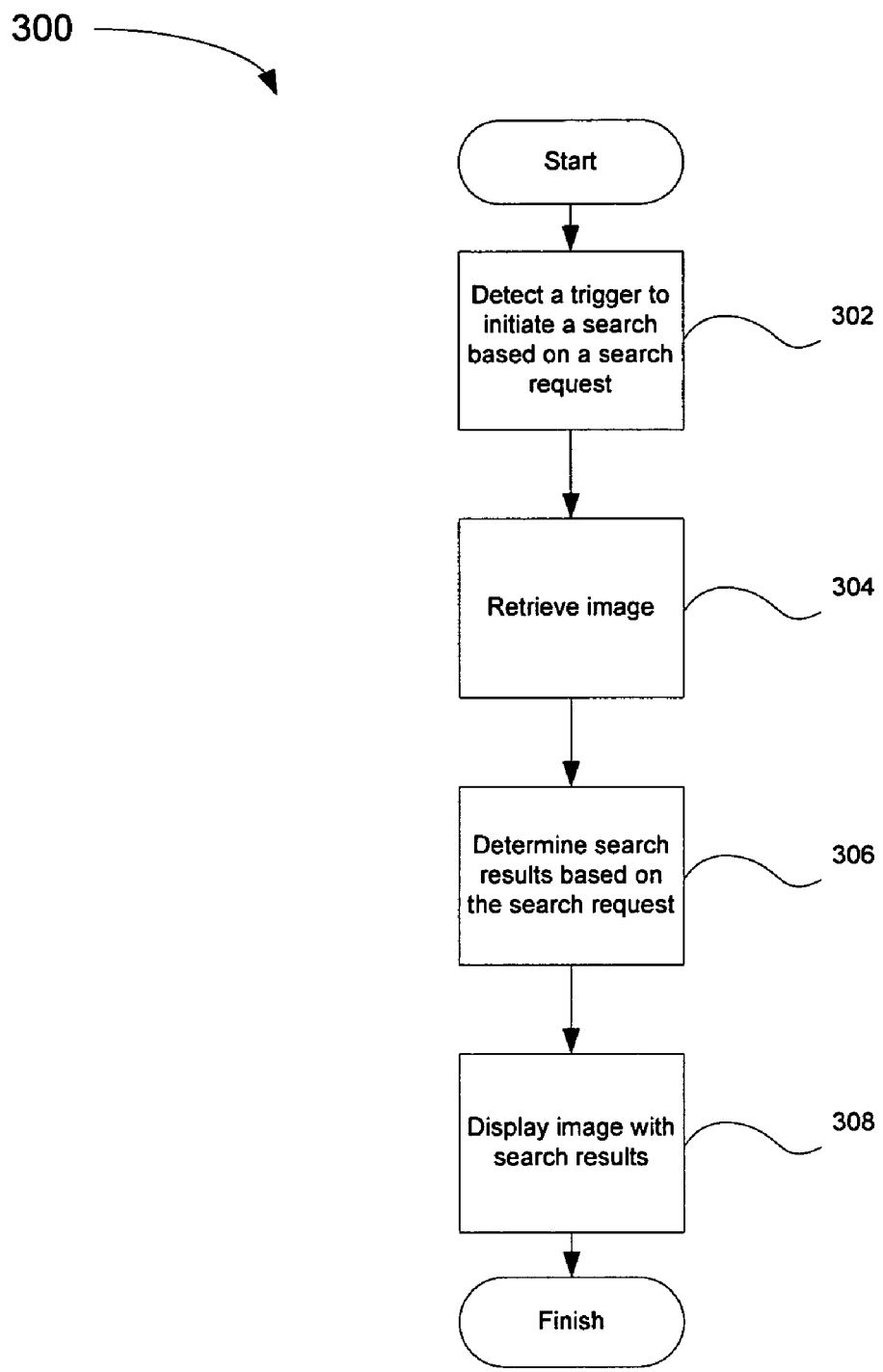
FIG. 3 is a flowchart describing a process for receiving a search trigger and displaying a selected image with search results according to various examples.

FIG. 3 is a flowchart describing a process 300 for receiving a search trigger and displaying a selected image with search results according to various examples. As discussed above, a search trigger may initiate a search and thus the selection and display of an image with the search results. For example, a search trigger may be the selection of the search button 104, or the typing of a letter during a search-as-you-type search.

In operation 302, a trigger to initiate a search related to a search request is detected. The trigger may be, for example, an event such as the selection of a search button (e.g., the button 104), typing a letter as part of a search, or any other event that may initiate a search or the display of search results. The search request may be, for example, search terms entered by a user.

In operation 304, an image is retrieved. The image may be selected based on the criteria described regarding the process 200 (see FIG. 2). For example, the image may be related to the search request, may be an advertisement, or may be related to a category of the search request.

In operation 306, search results based on the search request are determined. The search results may be retrieved from a local or remote source. For example, the search results may be determined using a search engine on the Internet. Alternatively, the search results may be generated from a local source such as a user's music collection or data on his hard drive.

In operation 308, the image is displayed with the search results. For example, as shown in FIGS. 1B and 1C, the image may be displayed behind (i.e., so that the search results are displayed over) the image. The image may create an environment to enhance a brand related to the search results, or to otherwise enhance a user's experience with a search.

Network Diagram

Figure 4:
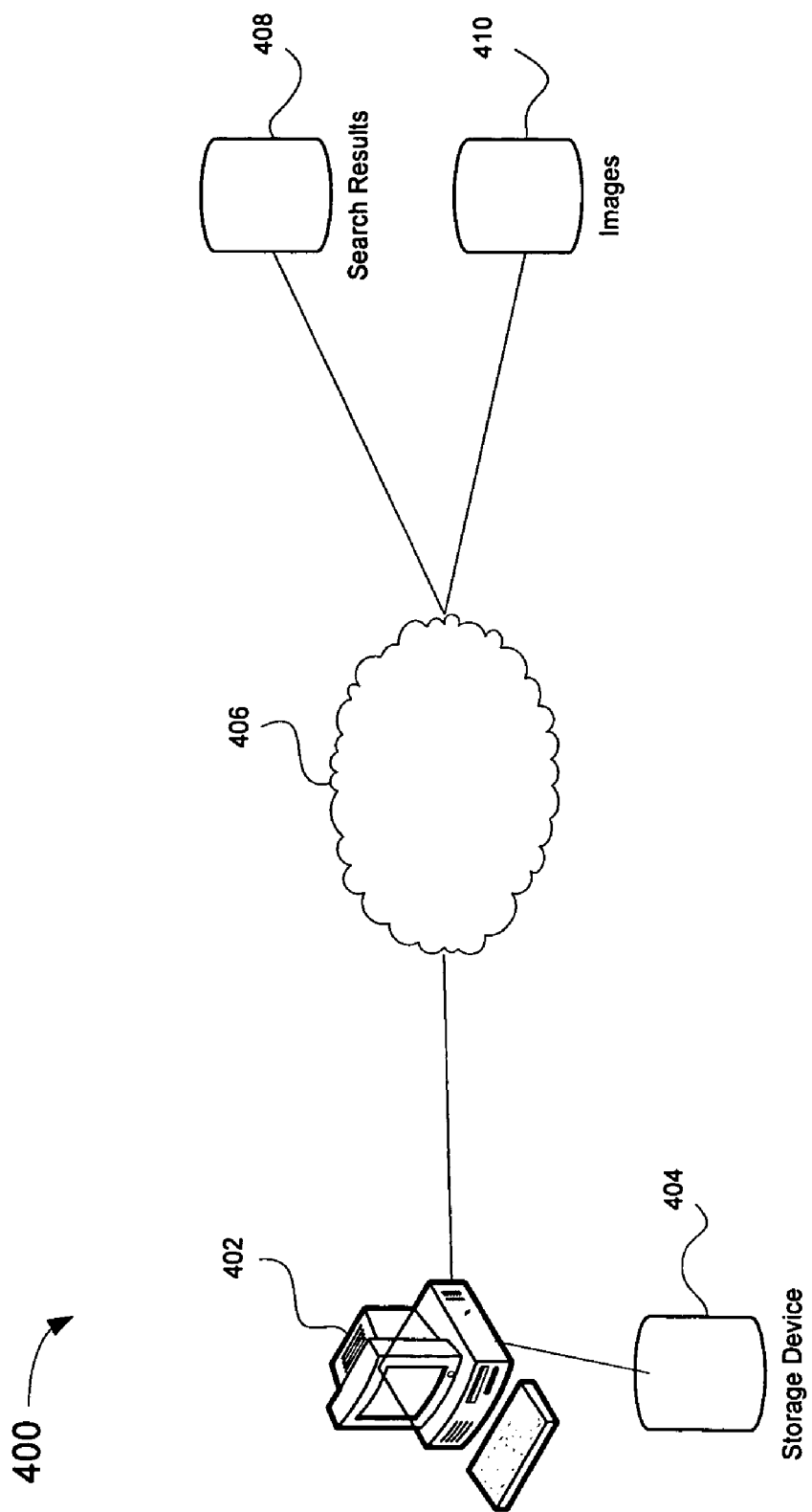
FIG. 4 is a network diagram illustrating an arrangement that may be used to present media with search results according to various examples.

FIG. 4 is a network diagram illustrating an arrangement that may be used to present media with search results according to various examples. A network diagram 400 illustrates a series of interconnected systems that may be used to store media, generate search results, and determine which of the stored media to present with the search results.

The network diagram 400 includes a computer system 402 including a storage device 404, a network 406, and databases 408 and 410. The computer system 402 may be, for example, a personal computer, but may also be a portable device such as a personal digital assistant (PDA) or cellular telephone, or any other type of processing system such a set-top box. The storage device 404 may a device such as a magnetic hard drive, volatile or non-volatile memory (such as a flash memory), optical drive, or other device capable of storing media. The computer system 402 may be, for example, the computer system 500 discussed regarding FIG. 5.

Referring back to FIG. 4, a search request may be entered into the computer system 402. For example, the computer system 402 may be running an application (such as a browser or media player) that includes a search function or search abilities (see, e.g., the window 100). A user may enter their search request into the application, and the application may select and retrieve an image and determine search results.

The image may be found on the storage device 404 or the database 410. For example, the image may be an image that is stored on a user's hard drive, and when the user searches for a file using the application, the image is presented with the search results (e.g., an image is displayed behind the search results). As another example, a user may search using a search engine. The search results may be retrieved from the database 408, and an image may be selected from and retrieved from the database 410. The database 408 may be a collection of search results such as links, and the database 410 may be one or more sources of images. Other combinations are possible and the above-described examples may be varied in design, function, and implementation. For example, the search results may be retrieved from the database 408, and the image may be taken from the storage device 404.

An Exemplary Computer System

Figure 5:
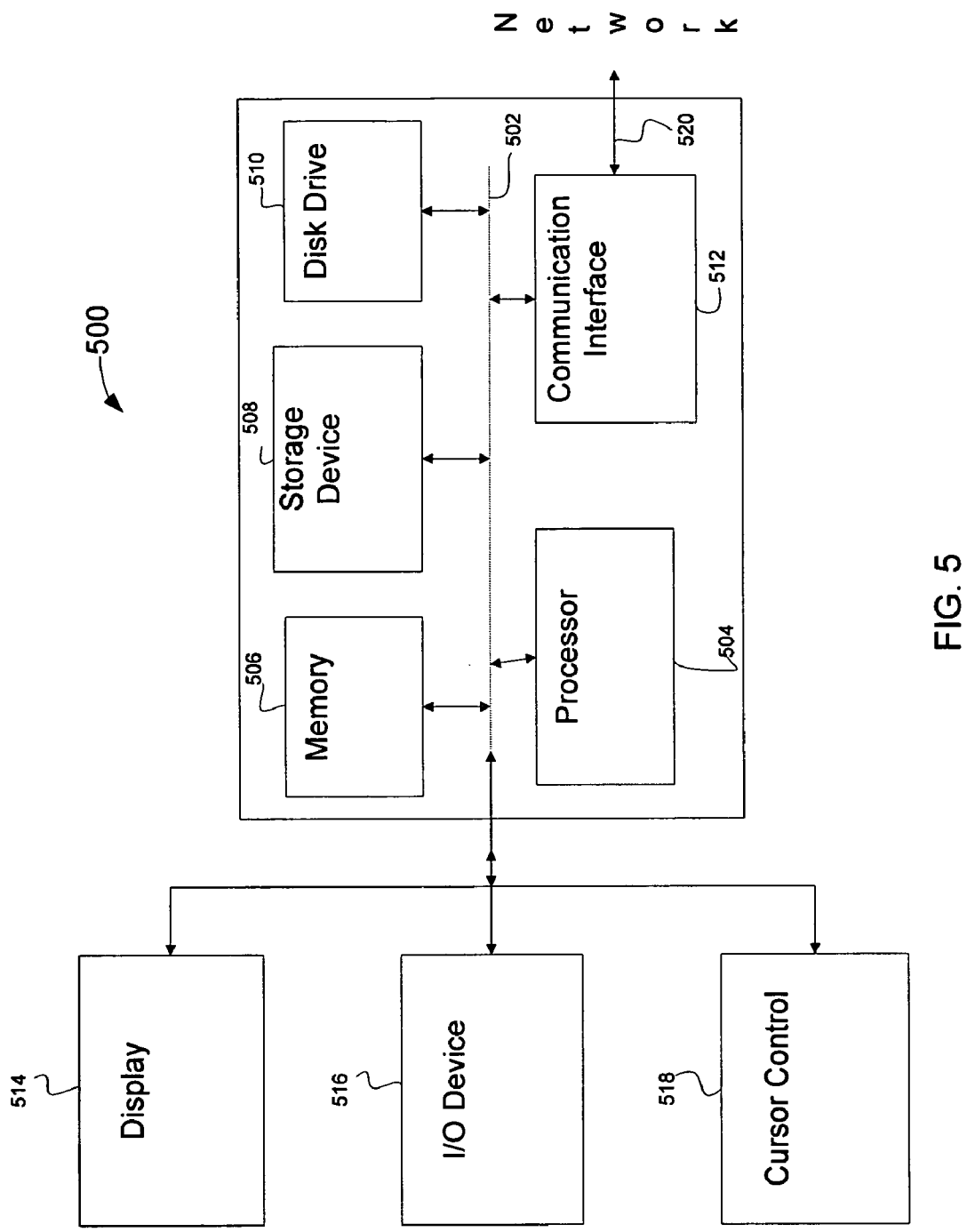
FIG. 5 is a block diagram illustrating an exemplary computer system suitable for presenting an image with search results, in accordance with various examples.

FIG. 5 is a block diagram illustrating an exemplary computer system suitable for presenting an image with search results, in accordance with various examples. In some examples, a computer system 500 may be used to implement computer programs, applications, methods, processes, or other software to perform the above-described techniques. The computer system 500 includes a bus 502 or other communication mechanism for communicating information, which interconnects subsystems and devices, such as a processor 504, a system memory 506 (e.g., RAM), a storage device 508 (e.g., ROM), a disk drive 510 (e.g., magnetic or optical), a communication interface 512 (e.g., modem or Ethernet card), a display 514 (e.g., CRT or LCD), an input device 516 (e.g., keyboard), and a cursor control 518 (e.g., mouse or trackball).

According to some examples, the computer system 500 performs specific operations by processor 504 executing one or more sequences of one or more instructions stored in the system memory 506. Such instructions may be read into the system memory 506 from another computer readable medium, such as the static storage device 508 or the disk drive 510. In some examples, hard-wired circuitry may be used in place of or in combination with software instructions to implement various examples.

Although the foregoing examples have been described in some detail for purposes of clarity of understanding, the examples are not limited to the details provided. There are many alternative ways of implementing the examples. The disclosed examples are illustrative and not restrictive.

What is claimed:

1. A method, comprising:
   in response to detecting a trigger related to a search request:
   determining a category for the search request;
   selecting an image from among a plurality of images, wherein the image is selected dependent upon the category of the search request, and dependent upon metadata associated with the plurality of images, wherein the metadata indicates a category for each image, and wherein said selecting is performed without downloading the plurality of images;
   subsequent to said selecting the image, retrieving the image;
   determining a search result based on the search request, wherein the search result is separate from the selected image; and
   presenting both the separate search result and the selected image inside a same window, wherein the selected image and the separate search result are simultaneously visible within the same window with the selected image displayed behind the separate search result;
   wherein said determining the category, said selecting, said retrieving, said determining the search result, and said presenting are all performed automatically in response to said detecting the trigger.

2. The method of claim 1, wherein detecting the trigger comprises detecting an event to initiate a search based on the search request.

3. The method of claim 1, wherein retrieving the image comprises retrieving an advertisement.

4. The method of claim 1, further comprising presenting a content related to the search request, the content being separate from the search result.

5. The method of claim 1, further comprising determining a first color of the search result based on a second color of the image behind the search result.

6. A method, comprising:
   detecting a trigger to initiate a search based on a search request;
   determining a category for the search request;
   selecting an image from among a plurality of images, wherein the image is selected dependent upon the category of the search request, and dependent upon metadata associated with the plurality of images, wherein the metadata indicates a category for each image, and wherein said selecting is performed without downloading the plurality of images in response to said detecting the trigger;
   retrieving the selected image;
   determining a search result based on the search request in response to said detecting the trigger, wherein the search result is separate from the selected image; and
   displaying both the selected image and the separate search result inside a same window, so that the selected image is displayed behind the separate search result, and the selected image and the separate search result are simultaneously visible within the same window;
   wherein said determining the category, said selecting, said retrieving, said determining the search result, and said displaying are all performed automatically in response to said detecting the trigger.

7. The method of claim 6, wherein detecting the trigger comprises detecting an event to initiate a search based on the search request.

8. A system, comprising:
   a memory configured to store an image; and
   a processor configured to detect a trigger related to a search request, and in response:
   determine a category for the search request;
   select an image from among a plurality of images, wherein the image is selected dependent upon the category of the search request, and dependent upon metadata associated with the plurality of images, wherein the metadata indicates a category for each image, and wherein said selecting is performed without downloading the plurality of images;
   subsequent to said selecting the image, retrieve the selected image;
   determine a search result based on the search request, wherein the search result is separate from the selected image; and
   present both the separate search result and the selected image inside a same window, so that the selected image is displayed behind the separate search result, and the selected image and the separate search result are simultaneously visible within the same window;
   wherein said determining the category, said selecting, said retrieving, said determining the search result, and said presenting are all performed automatically in response to said detecting the trigger.

9. The system of claim 8, wherein the processor is further configured to detect an event to initiate a search based on the search request.

10. A computer program product embodied in a computer readable storage medium storing computer instructions for:
    detecting a trigger related to a search request, and in response:

determining a category for the search request;

selecting an image from among a plurality of images, wherein the image is selected dependent upon the category of the search request, and dependent upon metadata associated with the plurality of images, wherein the metadata indicates a category for each image, and wherein said selecting is performed without downloading the plurality of images;

subsequent to said selecting the image, retrieving the image;

determining a search result based on the search request, wherein the search result is separate from the selected image; and presenting both the separate search result and the selected image inside a same window, so that the selected image is displayed behind the separate search result, and the selected image and the separate search result are simultaneously visible within the same window;

wherein said determining the category, said selecting, said retrieving, said determining the search result, and said presenting are all performed automatically in response to said detecting the trigger.

11. The computer program product of claim 10, wherein detecting the trigger comprises detecting an event to initiate a search based on the search request.

* * * * *